United States Patent [19]
Markuson, Jr.

[11] Patent Number: 4,719,332
[45] Date of Patent: Jan. 12, 1988

[54] TUBE SHRINKING OVEN

[75] Inventor: Arthur W. Markuson, Jr., Rochester, N.Y.

[73] Assignee: Strategic Products, Inc., Rochester, N.Y.

[21] Appl. No.: 859,836

[22] Filed: May 5, 1986

[51] Int. Cl.⁴ .......................... H05B 3/62; F27D 7/04
[52] U.S. Cl. .................... 219/388; 219/400; 219/411
[58] Field of Search ............... 219/388, 390, 343, 400, 219/494, 497; 34/25, 33, 48, 52, 219, 227; 432/121, 128, 144, 148, 152

[56] References Cited

U.S. PATENT DOCUMENTS

| | | | |
|---|---|---|---|
| 2,391,195 | 12/1945 | Ross | 34/219 |
| 2,504,110 | 4/1950 | Davis | 219/354 |
| 2,669,068 | 2/1954 | Wambreuze | 432/152 |
| 3,539,316 | 11/1970 | Trethewey | 34/52 |
| 3,869,249 | 3/1975 | Frische | 432/121 |
| 3,947,241 | 3/1976 | Caridis | 432/121 |
| 4,333,003 | 6/1982 | Rivera | 219/343 |
| 4,486,172 | 12/1984 | Dunning | 219/388 |

Primary Examiner—E. A. Goldberg
Assistant Examiner—Teresa J. Walberg

[57] ABSTRACT

A conveyor oven including an insulated housing having entry and exit openings, an endless open mesh conveyor having its upper run extending through the entry and exit openings and its lower run extending below the housing, an A.C. motor for driving the conveyor, a partition dividing the housing into first and second chambers, a heating element in the first chamber, a fan mounted on the housing and having its outlet in communication with the first chamber and having its inlet in communication with the second chamber, a deflector in the first chamber for directing air from the fan outlet toward the heating element and the conveyor, a lowermost portion on the partition for causing the air to be directed at the conveyor before passing into the second chamber for entry into the fan inlet, a first control arrangement for causing the conveyor to move in precisely timed increments through the housing and to have variable pause times between increments to thereby vary the time of conveyor passage through the housing, and a second control arrangement for varying the temperture in the housing by varying the length of time the heating element is energized at full power.

29 Claims, 12 Drawing Figures

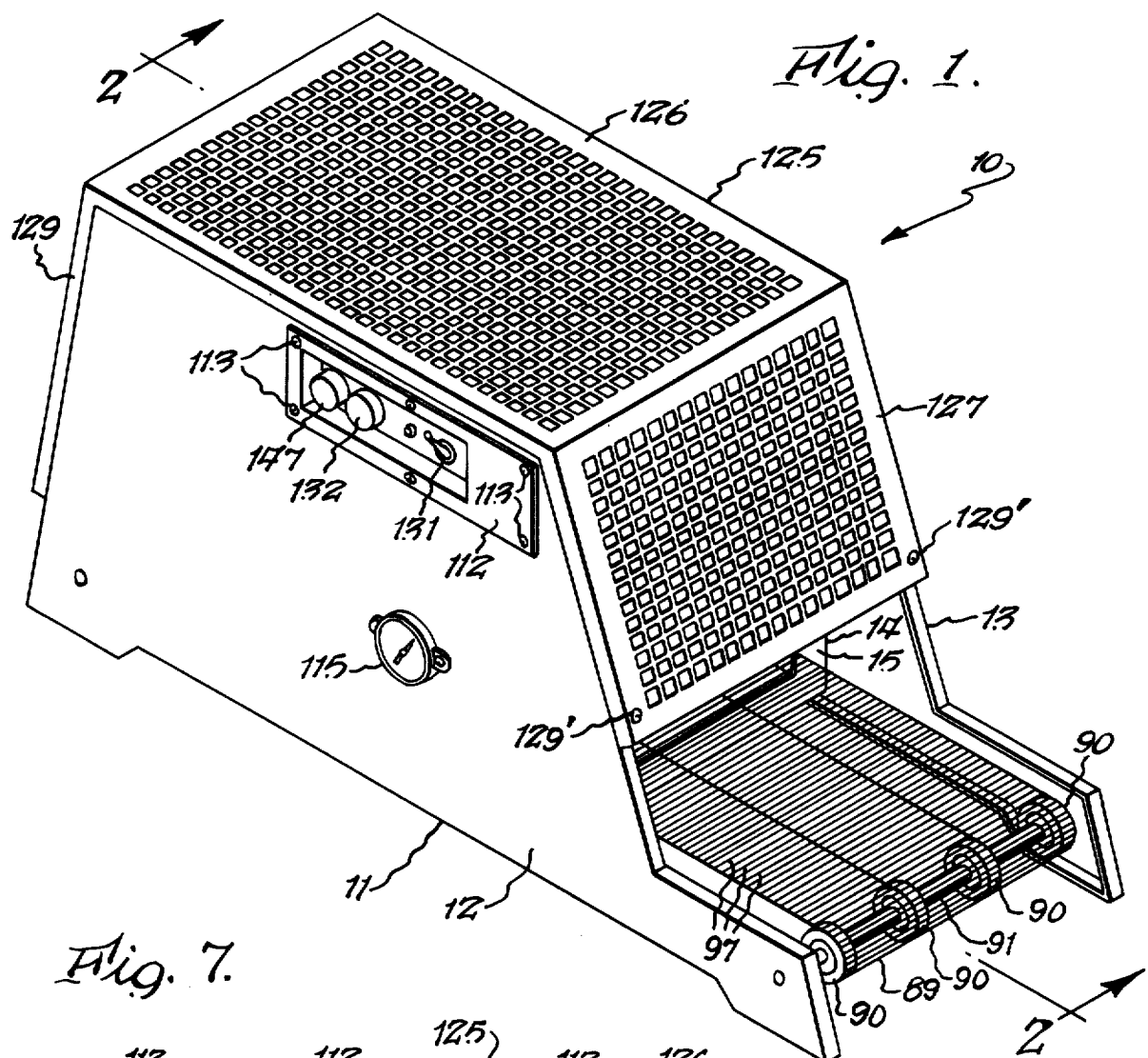
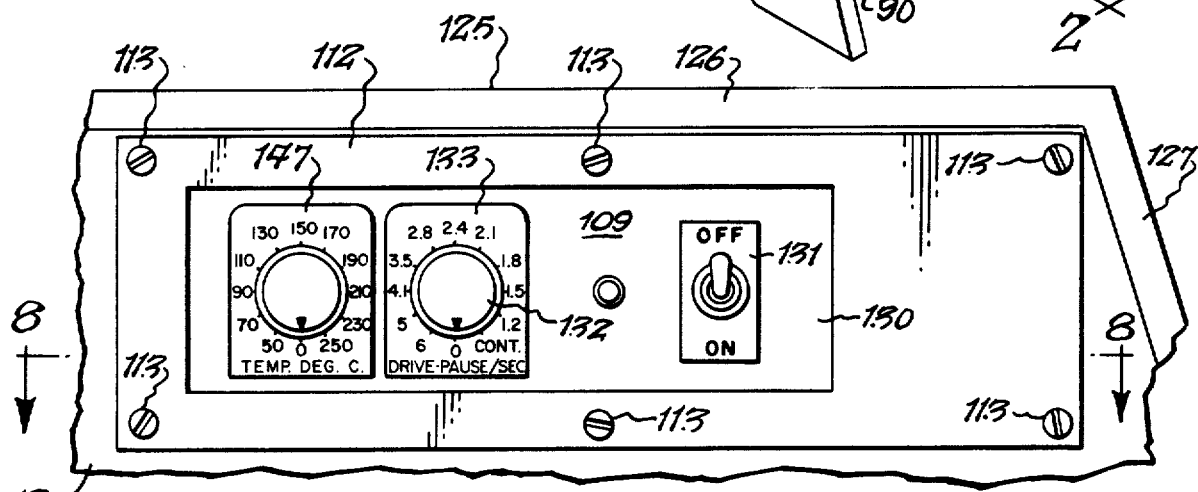
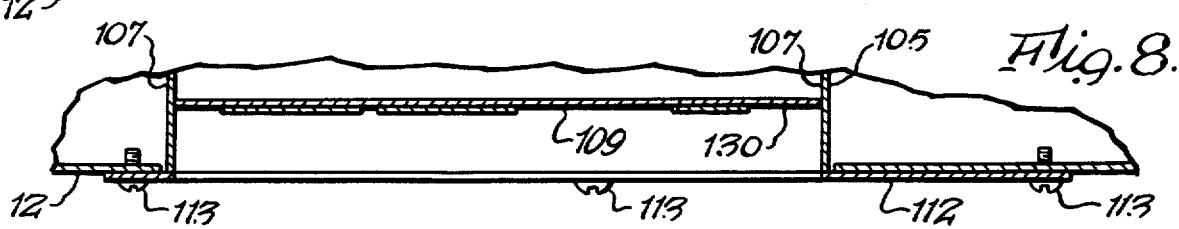

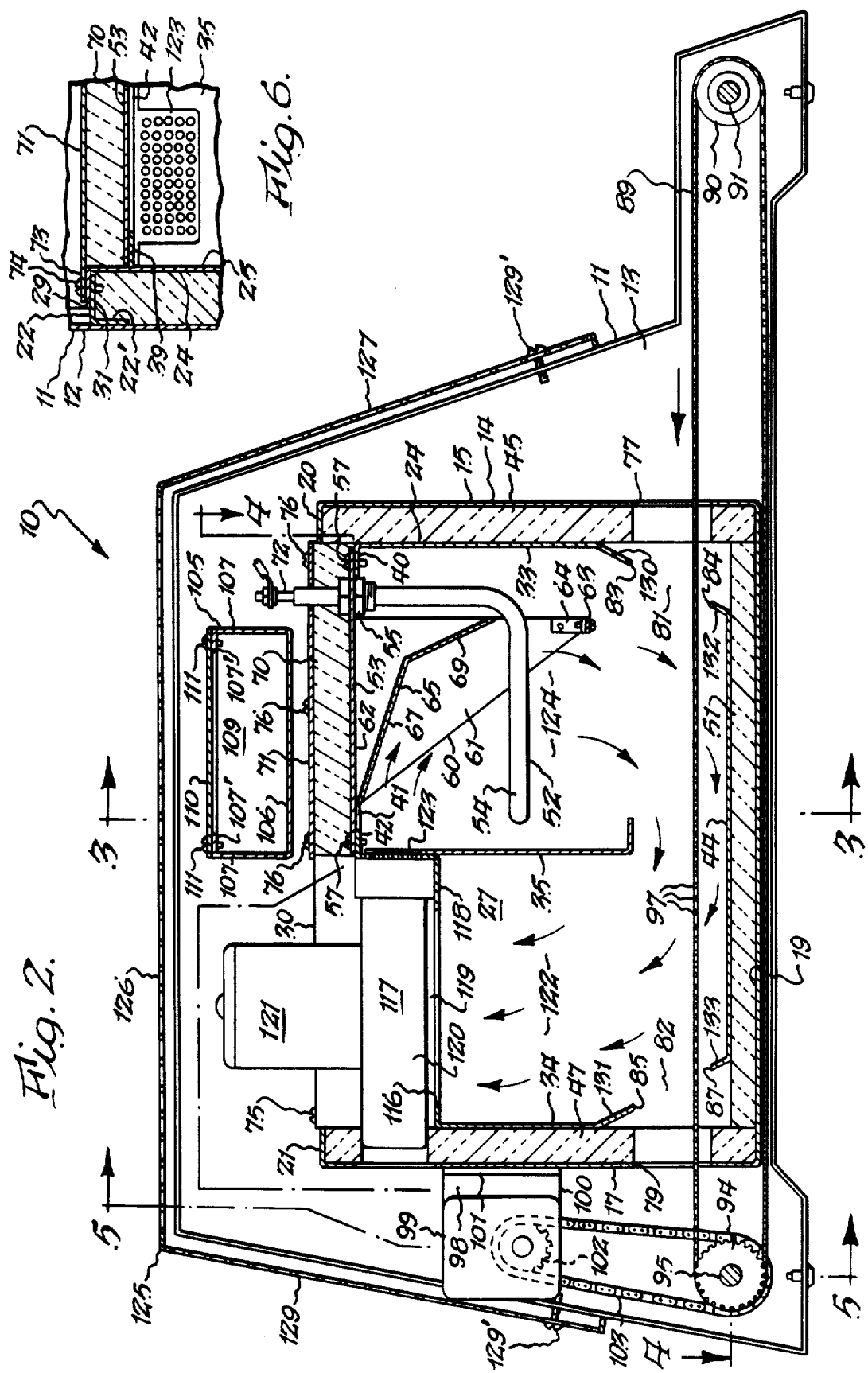

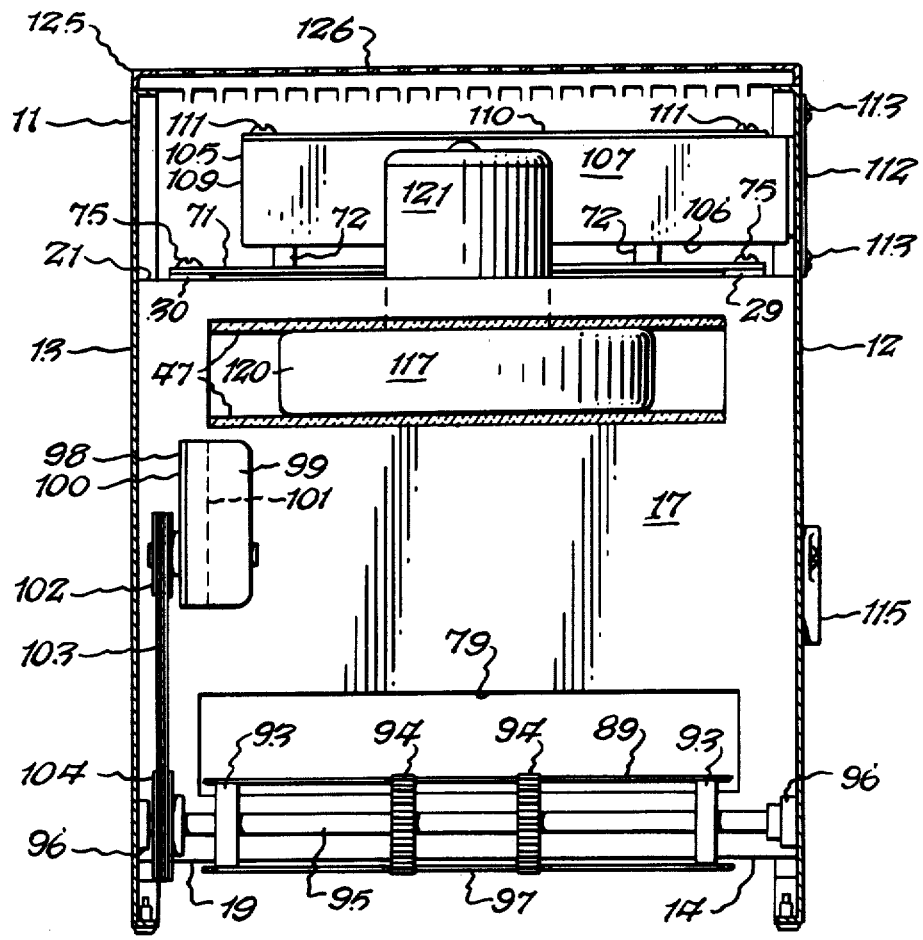
Fig. 5.
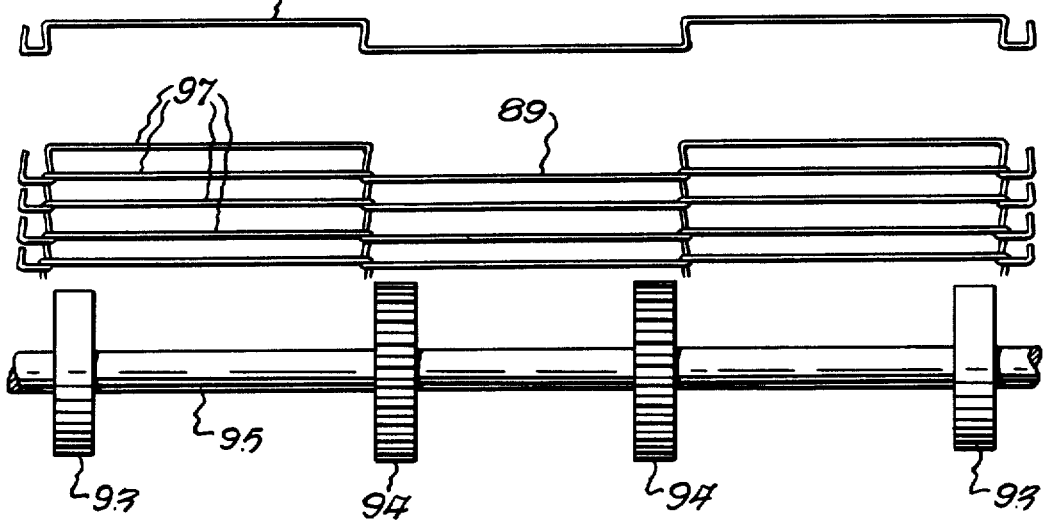
Fig. 9.
Fig. 10.

TUBE SHRINKING OVEN

BACKGROUND OF THE INVENTION

The present invention relates to an improved oven and method for hot air heating of shrink tubing and other types of items which require precise exposure to heat.

By way of background, certain manufacturing operations including those associated with the electrical, electronic and optical industries require the closely controlled application of hot air for heating various parts. A specific example is the heat-shrinking of thermoplastic tubing over wire-lugs and splices to insulate and reinforce the assemblies. The shrinkable tubing may be of any of several thermoplastic materials of various sizes, each of which has an optimum temperature and exposure time for maximum shrinkage and minimum damage.

By way of further background, the present practice for heat-shrinking tubing on wire-lug and wire-splice assemblies consists of applying air from a heat gun, hot air pencil or infrared heat gun individually to each assembly. The heat gun is generally a portable high velocity air blower with a high power heating element in the exhaust. The heat gun pulls in room temperature air and exhausts air at a temperature much higher than the optimum shrinking temperature of the thermoplastic tubing at which the heated air is directed. The higher temperature air is necessary for fast process time and to offset the cooling of the work by the ambient room air. The hot exhaust air is passed through a nozzle to provide a fast moving stream which is directed over the unshrunk tubing and the wire and lug assembly. As the tubing heats to its shrinking temperature, the operator moves the air stream relative to the work to heat the tubing on all sides for uniform shrinkage of the tubing. When the tubing has shrunk sufficiently, the work is removed from the air stream and allowed to cool. The quality of the finished assembly is highly dependent on the skill of the operator who must adjust the proximity of the nozzle relative to the work and further must direct the hot air stream around the assembly. In addition, the time that the workpiece is exposed to the hot air must be accurately gauged, as excessive heat or exposure may cause damage to either the tubing or the wire insulation. Alternatively, insufficiently exposure of heat may cause uneven or incomplete shrinkage of the tubing. Therefore the operator must develop the required degree of skill to apply the optimum temperature and time of exposure to each type of shrink tubing and other types of products.

SUMMARY OF THE INVENTION

It is accordingly one object of the present invention to provide an improved oven and method of heating shrink tubing and other parts at a relatively high rate of speed to yield a more uniform high quality product without the necessity of using skilled operators.

Another object of the present invention is to provide an improved method of heating different types of workpieces different amounts by the utilization of a constant heating temperature but varying the exposure time.

A further object of the present invention is to provide an improved oven and method of heating in which a conveyor belt is run through an oven at a constant speed for predetermined time intervals at all times but which is caused to pause for adjusted different time intervals to thereby expose different workpieces different predetermined amounts while subjecting them to a constant predetermined optimum temperature.

Yet another object of the present invention is to provide an improved hot-air oven which provides recirculating temperature-controlled air and an open mesh conveyor belt to thereby expose all portions of workpieces uniformly to the temperature-controlled air.

Still another object of the present invention is to provide an improved oven and method of operation which will expose a workpiece to a selective optimum combination of time and temperature. Other objects and attendant advantages of the present invention will readily be perceived hereafter.

The present invention relates to a conveyor oven comprising a housing, partition means dividing said housing into first and second chambers, a heating element in said first chamber, a fan mounted on said housing, an air inlet in said fan in communication with said second chamber, an air outlet in said fan for directing air at said heating element in said first chamber, entry and exit openings in said housing, conveyor means extending through said entry and exit openings, and a portion on said partition means proximate said conveyor means for directing air from said first chamber toward said conveyor means and toward said air inlet in said second chamber.

The present invention also relates to a method of operating a conveyor in an oven comprising the steps of providing a substantially constant heat source, causing said conveyor to move with intermittent substantially constant speed increments relative to said substantially constant heat source, and causing said conveyor to remain stationary for selective timed intervals between said intermittent movements at said substantially constant speed intervals.

The present invention also relates to a conveyor oven comprising a housing, a heating element in said housing, entry and exit openings in said housing, conveyor means extending through said entry and exit openings, a fan mounted in said housing for directing air at said heating element and said conveyor means, motor means for driving said conveyor means, and control means for intermittently energizing said motor means for predetermined time intervals to determine the length of time of passage of said conveyor means through said housing.

The various aspects of the present invention will be more fully understood when the following portions of the specification are read in conjunction with the accompanying drawings wherein:

BRIEF DESCRIPTION OF THE DRAWINGS

FIG. 1 is a perspective view of the improved conveyor oven of the present invention;

FIG. 2 is a cross sectional view taken substantially along line 2—2 of FIG. 1;

FIG. 5 is a fragmentary view, partially in cross section, taken substantially along line 5—5 of FIG. 2;

FIG. 6 is a fragmentary cross sectional view taken substantially along line 6—6 of FIG. 4;

FIG. 7 is an enlarged view of the various controls on the side of the conveyor oven;

FIG. 8 is a fragmentary cross sectional view taken substantially along line 8—8 of FIG. 7;

FIG. 9 is a plan view of one of the links of the open mesh conveyor;

FIG. 10 is a view showing the relationship between the open mesh conveyor and the drive sprockets therefor;

DESCRIPTION OF THE PREFERRED EMBODIMENTS

Figure 4:
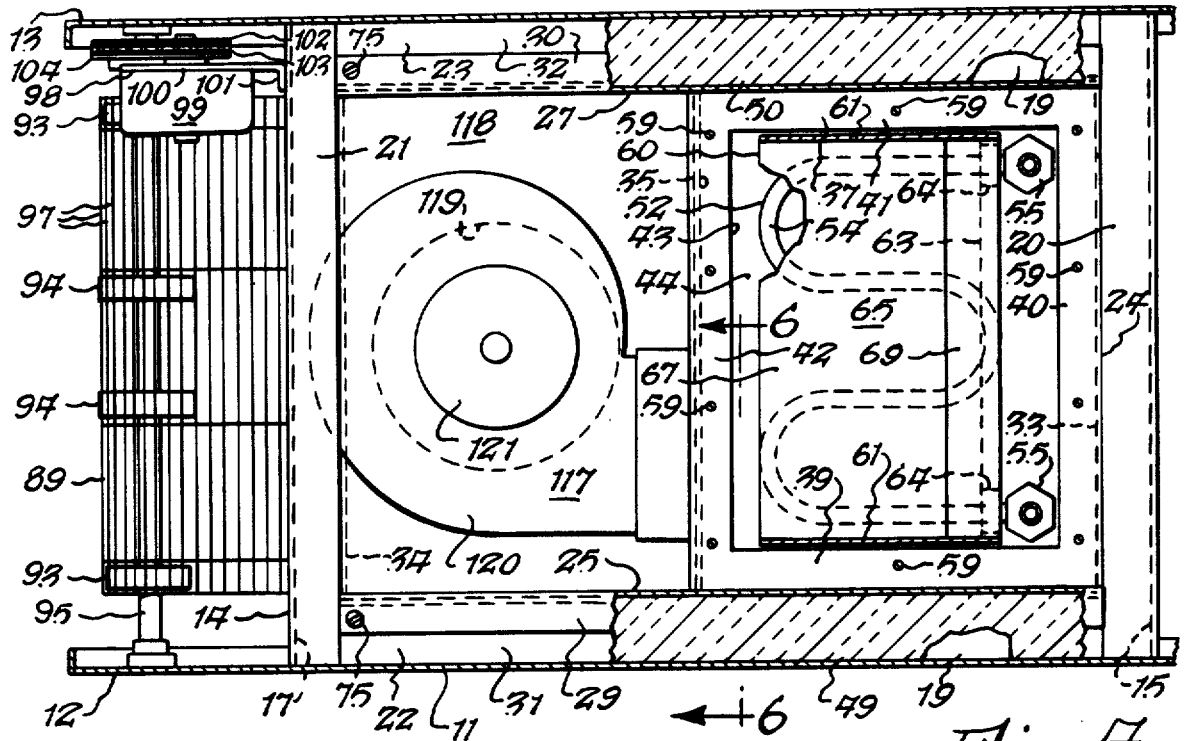
FIG. 4 is a fragmentary cross sectional view taken substantially along line 4—4 of FIG. 2.

The conveyor oven 10 includes an outer housing 11 which includes mirror image side panels 12 and 13 and a U-shaped member 14 (FIG. 2) consisting of end walls 15 and 17 and bottom wall 19. The upper ends of end walls 15 and 17 are bent over to form flanges 20 and 21, respectively. The outer edges of U-shaped housing portion 14 are secured to the inner sides of walls 12 and 13 by welding. The outer housing also includes angles 22 and 23 having their vertical legs 22' and 23', respectively, (FIG. 3) welded to sides 12 and 13, respectively. The horizontal legs 31 and 32 of angles 22 and 23, respectively, are at the same elevation as flanges 20 and 21, and the opposite ends of horizontal legs 31 and 32 abut flanges 20 and 21.

An inner housing 24 is mounted within outer housing 11. Inner housing 24 includes side plates 25 and 27 (FIGS. 3 and 4) having flanges 29 and 30, respectively, at their upper ends which overlie horizontal legs 31 and 32, respectively, of angles 22 and 23, respectively. An end plate 33 (FIGS. 2-4) has its opposite vertical edges welded to vertical side plates 25 and 27. A vertical end plate 34 also has its opposite vertical edges welded to side plates 25 and 27. An intermediate baffle plate or partition 35 also has its vertical side edges welded to plates 25 and 27 (FIGS. 2 and 4). Vertical plates 33 and 34 are formed from a single piece of metal which is bent to an inverted shape (FIG. 2) and which includes a top plate 37 consisting primarily of flanges 39, 40, 41 and 42 (FIG. 4) with a large open area 43 defined thereby, and also includes top plate 118 with opening 116 therein. A horizontal bottom plate 44 (FIG. 2) is spaced from the bottom edges of vertical plates 33, 34 and 35 and has its opposite sides welded to vertical side plates 25 and 27 of inner housing 24. Thus, the inner housing 24 is defined by plates 25, 27, 33, 34, 35, 37, 44 and 118 in the above-described orientation.

Suitable fireproof insulation is provided between the inner housing 24 and the outer housing 11. More specifically, insulation 45 is located between housing walls 15 and 33; insulation 47 is located between housing walls 17 and 34; insulation 49 is provided between housing walls 12 and 25; insulation 50 is provided between housing walls 13 and 27; and insulation 51 is provided between housing walls 19 and 44.

Figure 3:
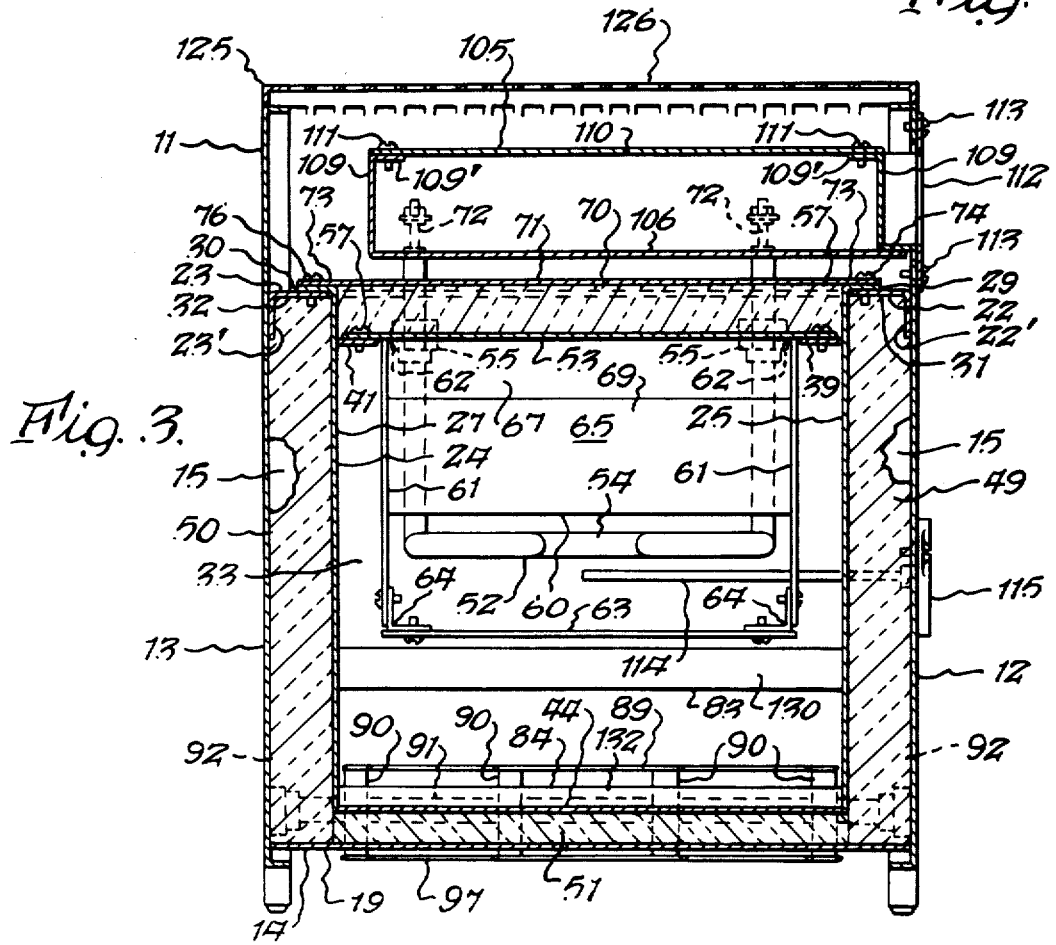
FIG. 3 is a cross sectional view taken substantially along line 3—3 of FIG. 2.

A heater coil assembly 52 is mounted on inner housing 24 by means of a rectangular plate 53 (FIGS. 2 and 3) to which serpentine heater coil 54 is attached by means of spaced nut assemblies 55. The outer edges of rectangular plate 53 overlie and rest on flanges 39, 40, 41 and 42 and are secured thereto by screws 57 which extend through holes 59 in flanges 39, 40, 41 and 42. An air deflector 60 forms part of the heater coil assembly and includes triangular side walls 61 which have their upper horizontal edges welded to the underside of plate 53 at 62 (FIGS. 2 and 3). The lowermost apices of triangular side walls 61 are connected to each other by a narrow band 63 which is secured to brackets 64. An end wall 65 includes upper portion 67 and lower portion 69, and the opposite edges of end wall 65 are welded to sides 61.

A rectangular block of insulation 70 is approximately the same size as plate 53 and is located on top of plate 53. A metal plate 71 (FIGS. 2 and 3) overlies insulation 70. The terminals 72 of heater coil 52 extend through aligned openings in insulation block 70 and plate 71. The opposite edge portions 73 of plate 71 rest on flanges 29 and 30 (FIG. 3) of inner housing 24 and screws 74 extend through one edge of plate 71 and through flanges 29 and 31, and screws 76 extend through the opposite edge of plate 71 and through flanges 30 and 32 to thereby assemble both the inner housing 24 and plate 71 to outer housing 11. In addition, screws, such as 75 (FIGS. 2 and 3), extend through flanges 29 and 31 and flanges 30 and 32 to further secure inner housing 24 to outer housing 11.

Aligned rectangular openings 77 and 79 (FIGS. 2 and 5) of equal size are located in end walls 15 and 17 of outer housing 11. Equal size openings 81 and 82 of inner housing 24 are in alignment with openings 77 and 79 of outer housing 14. Opening 81 has its opposite sides defined by side walls 25 and 27 and by lower edge 83 of wall 33 and edge 84 of bottom plate 44 (FIG. 2). Opening 82 also has its sides defined by side walls 25 and 27, and its upper edge is defined by lower edge 85 of vertical end wall 34 and its lower edge is defined by edge 87 of plate 44.

An endless wire mesh conveyor belt 89 extends around a plurality of idler pulleys 90 (FIGS. 1 and 2) keyed to shaft 91 which has its opposite ends journaled in bearings 92 in side walls 12 and 13. Wire mesh belt 89 has its opposite end mounted on pulleys 93 and 94 which are keyed to shaft 95 which is journalled in bearings 96 in side walls 12 and 13. Pulleys 94 have teeth thereon which engage the spaced interlocked wires 97 of belt 89 to thus drive it.

Shaft 95 is driven by an AC motor 99 mounted on leg 98 of angle bracket 100 which has its leg 101 suitably mounted on outer housing end wall 17. Motor 99 has a drive sprocket 102 which is encircled by chain 103 which also encircles sprocket 104 keyed to shaft 95 to thereby drive it as required.

The electrical wiring and controls are mounted in rectangular box 105 (FIGS. 2 and 3) having bottom wall 106, side walls 107, and end walls 109. A top plate 110 is secured to flanges 107' and 109' at the upper edges of side walls 107 and 109, respectively, by means of screws 111. A plate 112 (FIG. 1) constitutes an extension of side walls 107 and extends perpendicularly thereto and is secured to outer housing side wall 12 by means of screws 113. The controls mounted on the end of control housing 105 are shown in FIG. 7. A thermocouple probe 114 is located below heating element 52 to provide a visual indication of temperature on dial 115.

A centrifugal fan 117 is mounted on horizontal plate 118 which extends between plates 34 and 35. Fan 117 has an air inlet 119 in its housing 120 which is mounted below drive motor 121. The air inlet 119 receives air from chamber 122 through opening 116, chamber 122 being located between baffle or partition 35 and end wall 34. The fan outlet 123 discharges air against air deflector 60 which directs the air over heating element 52 in chamber 124 located between baffle 35 and end wall 33. The lower edge portions of end walls 33 and 34 are bent to form flanges 130 and 131, respectively, which are in alignment with flanges 132 and 133, respectively, at the opposite ends of bottom plate 44. The location of air inlet 119 and air outlet 123 on opposite sides of vertical partition plate 35 and the combination of air deflector 60 and the orientation of flanges 130, 131, 132 and 133 causes an air flow in the direction of the arrows in FIG. 2. Thus, hot air is recirculated within inner housing 24. A grill 125 includes a top portion 126, a front 127 and a rear 129 and is secured to side walls 12 and 13 by means of screws 129'.

In accordance with the present invention, the controls for the conveyor oven 10 can provide various combinations of exposure time and effective temperature for articles passing thorugh the oven on the conveyor belt 89.

Broadly, the time of exposure is effected by running the conveyor at a constant speed for predetermined preset constant periods of time and varying the dwell time of the conveyor so as to selectively vary the total time of exposure for articles passing through the oven. The temperature is effectively varied by energizing the heater coil 52 at full power for the necessary time intervals required to maintain a preset temperature.

More specifically, the controls for the oven 10 are located on panel 130 (FIG. 8) on the face of control box 105. There is a master power switch 131 which turns on the main power to the oven. The effective belt speed is controlled by switch 132 which points to any one of a number of settings. The switch position O is for stopping the belt. The switch position CONT is for running the belt continuously. All of the other positions are for setting the pause time between continuous constant motor running times. The motor and its associated linkage cause the belt to be driven for one inch of travel during the drive time of 0.8 of a second. The numbers which appear on the face 133 associated with switch 132 are the pause times in seconds between each 0.8 of a second run time. Thus, the total time of exposure of an article on belt 89 as it travels between inner housing walls 33 and 34 can be preset. As can be visualized from FIG. 2, the temperature between walls 33 and 34 is maintained at a substantially constant value because the air is continuously circulated. In addition, because belt 89 is of the open mesh type, the hot air will contact the entire peripheries of articles thereon, as can be visualized from the air flow arrows of FIG. 2. At this point it should also be noted that the lower run of belt 89 passes below outer housing bottom plate 19 and thus is cooled after it leaves the oven.

Figure 11:
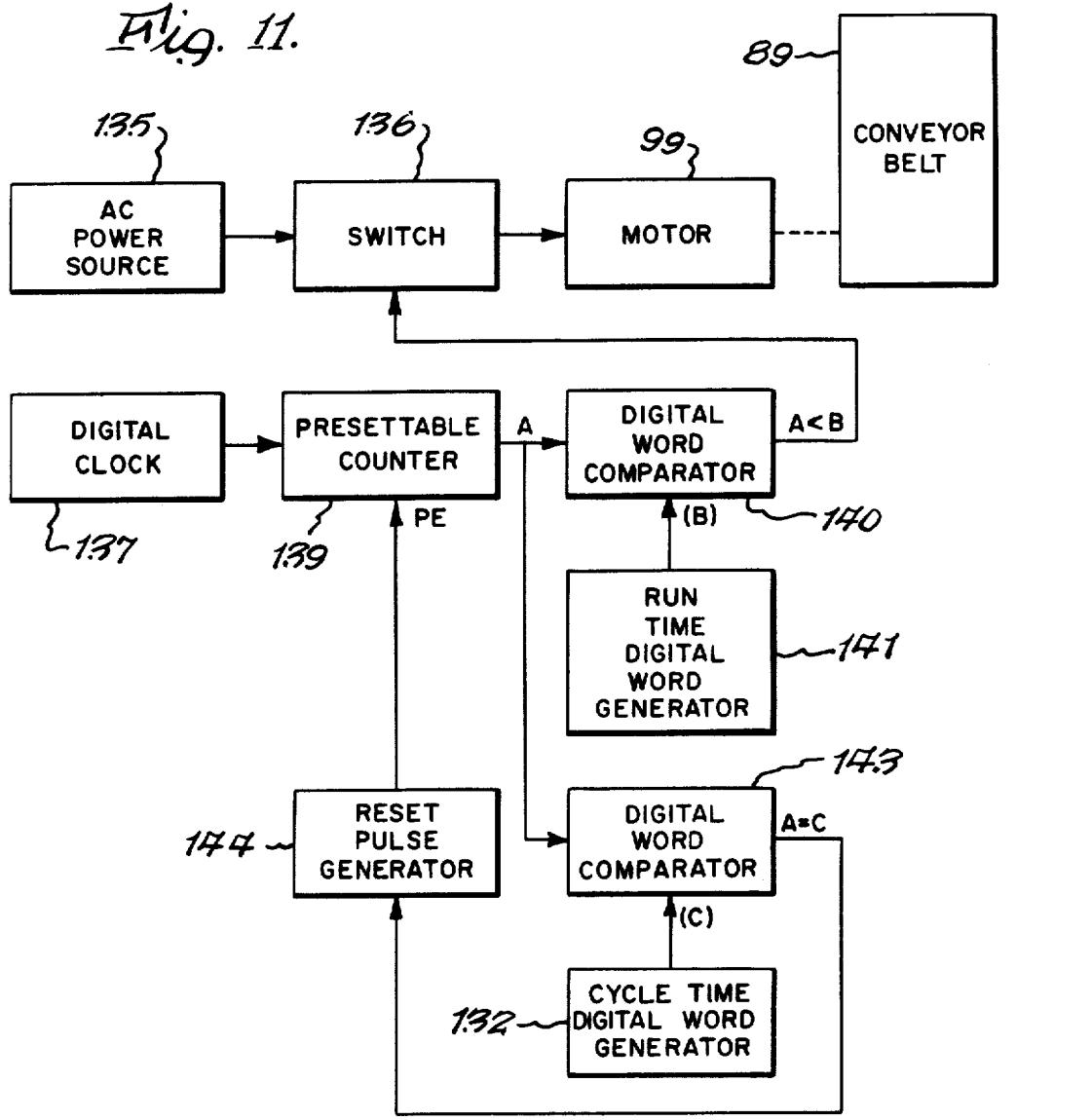
FIG. 11 is an electrical block diagram of the control circuit for the conveyor belt.

The electrical block diagram for controlling the movement of the conveyor belt 89 is shown in FIG. 11. A motor 99 which drives the belt 89 is powered from an AC power source 135 through switch 136 which is a solid state relay which is either on or off, thus causing the motor 99 to either run or remain stationary. A digital clock 137, which may be implemented by a free running timer circuit such as one-half of a dual type 556 timer chip, generates a digital clock signal which clocks a presettable counter 139. The counter 139 may be a BCD counter made up of two 4029 chips connected in tandem. The parallel output of counter 139 is a BCD digital word which represents the number of clock cycles elapsed since the start of the counting cycle, which occurs when the counter 139 is preset. A run time digital word generated at 141, established by hard wiring or with a digital switch, is connected to the B inputs of a comparator 140. The A inputs to the comparator are from the counter 139. The comparator 140 may be implemented by two 4885 chips in tandem. When A is less than B, the counter provides an output, preferably through gates and a drive circuit which provide proper switch drive levels and may be independently controlled, which causes the switch 136 to remain closed. The run time digital word therefore determines the period in each cycle when the motor runs. The motor 99 drives conveyor belt 89. In other words, during the beginning of each count cycle, the motor 99 runs for a period of time equal to the number of cycles of clock frequency as determined by the magnitude (B) of the digital word outputted at 141, and then the comparator 140 produces a signal which causes switch 136 to be opened to cause motor 99 to stop. A second comparator 143, similar to the comparator 140, compares the digital word output from resettable counter 139 (the A input thereto) with another digital word (the C input thereto) which is selected by the time switch 132 which determines the pause time of the belt by setting the duration of the timing cycle. The switch 132 is a digital switch which can set the cycle time at various intervals. Each cycle includes the run time set by the run time word generator 141 and a pause time for the remainder of the cycle. The belt will pause until the count A from the counter 139 equals the cycle time word C and a signal is obtained from comparator 143 which is used to generate a preset command using the reset pulse generator 144 which may be implemented with the other half of the timer chip connected, or a one-shot. In other words, when the word inputs A and C to comparator 143 become equal, a presetting signal will be applied to reset pulse generator 144 which causes the resettable counter 139 to preset to zero or some other count. Another timing cycle will then begin. Thus, the motor run time is controlled by comparator 140 and the dwell time is controlled by comparator 143. For continuous running of the belt the switch 132 is moved to the CONT position wherein the cycle time is set shorter than the run time so that the switch 136 remains closed. For stopping the belt the switch 131 is turned off directly (the timing cycle is bypassed). The remainder of intermediate belt speeds are obtained by setting the cycle time longer than the motor run time. The motor run time is normally set during assembly and is not changed by the operator.

It can thus be seen that the control circuit of FIG. 11 operates on a constant speed fixed time motor run intervals interspersed with selectively variable motor pause intervals, to thereby control the time that a workpiece will remain in the oven. The on-time to off-time is set precisely by digital counting methods, and the speed during the on-time is relatively constant due to the employment of an AC motor. The use of the AC motor also eliminates the requirement for brush replacement which would be necessary for a DC motor operating for long periods of time.

Figure 12:
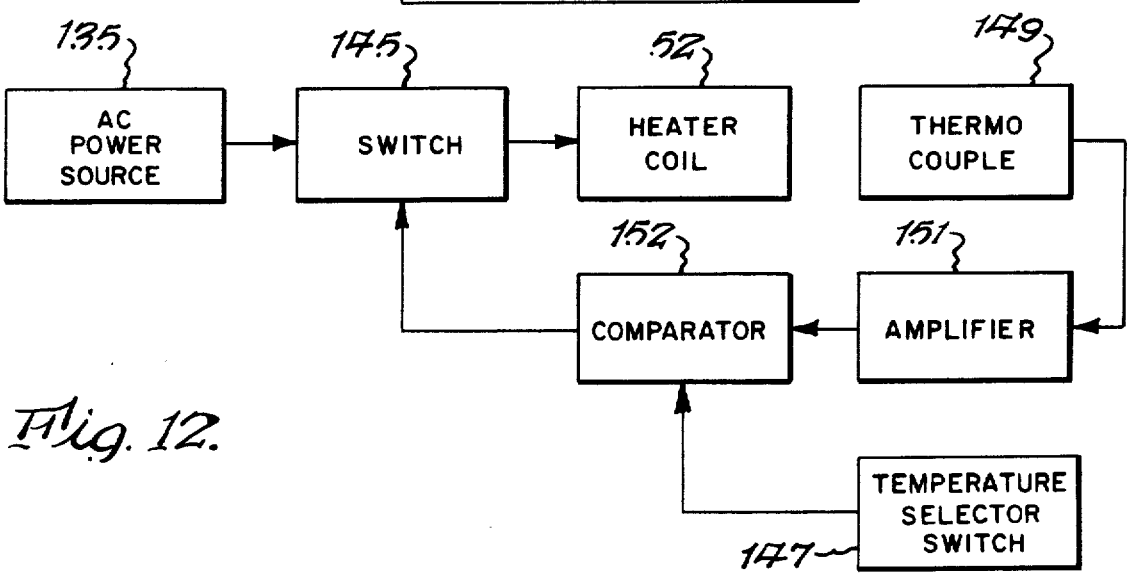
FIG. 12 is an electrical block diagram of the temperature control circuit.

The temperature control circuit is shown in FIG. 12. The power to heater coil 52 is controlled by switch 145 which is a solid stat relay connected to AC power source 135. The desired temperature is set by temperature selector switch 147 (FIGS. 8 and 12) which is calibrated from 0° C. to 250° C. as shown in FIG. 8. In this respect, the first increment is between 0° C. and 50° C. and the remainder of the increments are in 20° C. intervals up to 250° C. The actual oven temperature is sensed by thermocouple 149 within the oven, and a signal is outputted to instrumentation type amplifier and compared to a temperature reference voltage in comparator 152, said temperature reference voltage having been set by temperature selector switch 147. When the actual oven temperature is lower than the temperature reference voltage, the comparator 152 will produce an output to cause switch 145 to close, to thereby energize heater coil 52 at its full power. When the oven temperature, as sensed by thermocouple 149 exceeds the desired value set by selector switch 147, comparator 152 will terminate producing an output to switch 145 and it will open to turn the heater coil 52 off. The oven temperature thus cycles above and below the value set on selector switch 147, while the heater element is intermittently energized at full power. The deviation about the set value is maintained at a very small level by adjustment of the amplifier gain and feedback characteristics. Thus, the heater energization circuit of FIG. 12 utilizes a heater coil energized at full value for different time cycles to maintain different selected temperatures substantially constant within the oven.

It can thus be seen that the improved oven of the present invention is manifestly capable of achieving the above enumerated objects, and while preferred embodiments of the present invention have been disclosed, it will be appreciated that it is not limited thereto but may be otherwise embodied within the scope of the following claims.

What is claimed is:

1. A conveyor oven for applying predetermined amounts of heat to an article comprising a housing, entry and exit openings in said housing, conveyor means in said housing and extending through said entry and exit openings of said housing for conveying said article through said housing, means for supplying heated air to said article on said conveyor means within said housing, motor means for driving said conveyor means, and control means for intermittently energizing said motor means for driving said conveyor means for predetermined fixed time intervals and for selectively deenergizing said motor means for selectively variable time intervals between said fixed time intervals to thereby determine the length of time of passage of said conveyor means through said housing and thus determine the length of heating time of said article.

2. A conveyor oven as set forth in claim 1 including second control means associated with said means for supplying heated air for varying the temperature of said heated air applied to said article in said housing.

3. A conveyor oven comprising a housing, partition means dividing said housing into first and second side-by-side heating chambers, an electrical heating element in said first heating chambers, a fan mounted on said housing, an air inlet in said fan in communication with said second heating chamber, an air outlet in said fan for directing air directly from said fan into said first heating chamber and at said electrical heating element in said first heating chamber to thereby produce heated air by convection for heating said first and second heating chambers, entry and exit openings in said housing, conveyor means extending through said entry and exit openings, and a portion of said partition means being located proximate said conveyor means for directing heated air from said first heating chamber toward said conveyor means and through said second heating chamber and toward said air inlet in communication with said second heating chamber.

4. A conveyor oven as set forth in claim 3 wherein said electrical heating element extends substantially entirely across said first heating chamber, and wherein said air outlet is located above said electrical heating element, and wherein said conveyor means comprises an endless belt having an upper run and a lower run.

5. A conveyor oven as set forth in claim 4 wherein said upper run passes through said entry and exit openings.

6. A conveyor oven as set forth in claim 4 wherein said conveyor means comprises an open mesh belt.

7. A conveyor oven as set forth in claim 3 including a deflector means in said first heating chamber for deflecting air from said air outlet toward said electrical heating element.

8. A conveyor oven as set forth in claim 3 including a constant speed AC motor for driving said conveyor means at a constant speed.

9. A conveyor oven as set forth in claim 8 including control means for intermittently energizing said AC motor for predetermined time intervals to drive said conveyor at said constant speed during said predetermined time intervals.

10. A conveyor oven as set forth in claim 9 wherein said control means include means for causing said AC motor to remain unenergized for predetermined selectively variable time intervals to thereby vary the heat applied to an article on said conveyor.

11. A conveyor oven as set forth in claim 3 including an inner housing mounted within said housing for defining said first and second heating chambers, first means mounting said electical heating element within said first chamber of said inner housing, and second means mounting said fan on said second heating chamber of said inner housing.

12. A conveyor oven as set forth in claim 11 including insulation between said housing and said inner housing.

13. A conveyor oven as set forth in claim 12 wherein said insulation is located on all sides of said inner housing.

14. A conveyor oven as set forth in claim 11 wherein said housing includes spaced vertical side panels and a U-shaped member having vertical end walls and a horizontal bottom wall, outer vertical edges on said vertical end walls and said bottom wall of said U-shaped member, means securing said outer edges to said vertical side panels, and wherein said inner housing includes vertical side plates which extend substantially parallel to said vertical side panels and are spaced therefrom and a pair of substantially parallel end plates extending substantially perpendicularly to said vertical side plates and being located in spaced substantially parallel relationship to said vertical end walls and a horizontal bottom plate having opposite sides secured to said vertical side plates and being located in substantially parallel spaced relationship to said horizontal bottom wall, means mounting said inner housing within said housing, and wherein a top plate is located at the top of said inner housing, insulation between said housing and said inner housing, and wherein said fan is mounted on said top plate, and wherein said partition means extends downwardly from said top plate of said inner housing.

15. A conveyor oven as set forth in claim 14 wherein said top plate of said inner housing includes a lower horizontal portion and an upper horizontal portion and a vertical portion therebetween, and wherein said air inlet of said fan is mounted on said lower horizontal portion, and wherein said air outlet is located at said vertical portion of said top plate of said inner housing.

16. A conveyor oven as set forth in claim 15 including first openings in said vertical end walls of said U-shaped member, second openings in said end plates of said inner housing, said first and second openings being in alignment and comprising said entry and exit openings.

17. A conveyor oven as set forth in claim 3 including a motor for driving said conveyor means, and control means for intermittently energizing said motor for predetermined time intervals to determine the time of passage of said conveyor means through said first and second heating chambers to thereby determine the amount of time that an article on said conveyor is subjected to said heated air in said first and second heating chambers.

18. A conveyor oven as set forth in claim 17 wherein said predetermined time intervals are fixed.

19. A conveyor oven as set forth in claim 17 wherein said control means include means for causing said motor to remain unenergized for second predetermined time intervals, to thereby further determine the time of passage of said conveyor means through said first and second heating chambers and thus determine the length of the heating time of an article on said conveyor means.

20. A conveyor oven as set forth in claim 19 wherein said second predetermined time intervals are variable, to thereby produce variable heating times during passage of said conveyor means through said first and second heating chambers.

21. A conveyor oven as set forth in claim 17 including second control means for energizing said heating element at full power for variable time periods to produce different heating temperatures.

22. A conveyor oven as set forth in claim 21 wherein said control means include means for causing said motor to remain unenergized for second selectively variable predetermined time intervals, to thereby further determine the time of passage of said conveyor means through said first and second heating chambers and thus determine the length of the heating time of an article on said conveyor means.

23. A method of operating an oven having a conveyor therein to subject an article on said conveyor to a predetermined amount of heat as it passes through said oven comprising the steps of providing a substantially constant source of heat within said oven, causing said heat source to heat air by convection to produce heated air, causing said heated air to flow through said oven, causing said conveyor to move with a plurality of intermittent substantially constant speed movements through said heated air within said oven, and causing said conveyor to remain stationary for selective timed intervals between said intermittent movements at said substantially constant speed to thereby subject said article on said conveyor to said predetermined amount of heat supplied by said heated air.

24. A method as set forth in claim 23 including the step of varying the length of selectively said time intervals to thereby vary the amount of heat applied to said article on said conveyor.

25. A method as set forth in claim 23 wherein the step of providing a substantially constant heat within said oven comprises the step of intermittently energizing an electric heat element for the time periods required to maintain the effective temperature constant.

26. A conveyor oven for applying a predetermined amount of heat to an article comprising a housing, a heating element in said housing, entry and exit openings in said housing, conveyor means extending through said entry and exit openings of said housing for conveying said article through said housing, a fan mounted in said housing for directing air at said heating element to produce heated air and causing said heated air to pass over said conveyor means within said housing, motor means for driving said conveyor means, and control means for intermittently energizing said motor means for predetermined time intervals to determine the length of time of passage of said conveyor means through said heated air in said housing to thereby apply said predetermined amount of heat to said article.

27. A conveyor oven as set forth in claim 26 wherein said control means include means for causing said motor means to remain unenergized for second variable predetermined time intervals, to thereby produce variable heating times.

28. A conveyor oven as set forth in claim 26 including second control means for energizing said heating element at full power for variable time periods to produce different heating temperatures.

29. A conveyor oven as set forth in claim 28 wherein said control means include means for causing said motor means to remain unenergized for second variable predetermined time intervals, to thereby produce variable heating times.

* * * * *

UNITED STATES PATENT AND TRADEMARK OFFICE
CERTIFICATE OF CORRECTION

PATENT NO. : 4,719,332

DATED : January 12, 1988

INVENTOR(S) : Arthur W. Markuson, Jr.

It is certified that error appears in the above-identified patent and that said Letters Patent is hereby corrected as shown below:

Column 6, line 61, change "stat" to --state--.

Column 7, line 54 (claim 3), change "chambers" to --chamber--.

Column 8, line 12 (claim 7), change "3" to --4--;
          line 13 (claim 7), cancel "a".

Signed and Sealed this

Fifth Day of July, 1988

*Attest:*

DONALD J. QUIGG

*Attesting Officer*        *Commissioner of Patents and Trademarks*